US011099666B2

(12) United States Patent
Su et al.

(10) Patent No.: US 11,099,666 B2
(45) Date of Patent: Aug. 24, 2021

(54) WHEEL DEVICE APPLIED TO A MOUSE

(71) Applicant: DARFON ELECTRONICS CORP., Taoyuan (TW)

(72) Inventors: Chen-Yun Su, Taoyuan (TW); Da-Shan Hsu, Taoyuan (TW); Shao-Lun Hsiao, Taoyuan (TW); Ling-Hsi Chao, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/795,602

(22) Filed: Feb. 20, 2020

(65) Prior Publication Data
US 2021/0041961 A1 Feb. 11, 2021

(30) Foreign Application Priority Data
Aug. 8, 2019 (TW) ................................ 108128231

(51) Int. Cl.
G06F 3/0362 (2013.01)
G06F 3/0354 (2013.01)
G06F 3/03 (2006.01)

(52) U.S. Cl.
CPC .......... *G06F 3/0362* (2013.01); *G06F 3/0312* (2013.01); *G06F 3/03543* (2013.01); *G06F 3/0317* (2013.01)

(58) Field of Classification Search
CPC .. G06F 3/0362; G06F 3/03543; G06F 3/0312; G06F 3/0317; G06F 3/033; G06F 3/0321; G06F 3/0354; G06F 3/03541

USPC ......................................... 345/163–167, 184
See application file for complete search history.

(56) References Cited

U.S. PATENT DOCUMENTS 6,340,966 B1 * 1/2002 Wang .................. G06F 3/03543
200/11 B
6,492,976 B1 12/2002 Wang
2005/0110757 A1 * 5/2005 Lu .......................... G06F 3/0362
345/163
2005/0146500 A1 * 7/2005 Cheng ................... G06F 3/0362
345/163

(Continued)

FOREIGN PATENT DOCUMENTS

CN 2416529 Y 1/2001
CN 200969084 Y 10/2007
CN 106339112 B 1/2019

(Continued)

*Primary Examiner* — Jimmy H Nguyen
(74) *Attorney, Agent, or Firm* — Winston Hsu

(57) ABSTRACT

A wheel device applied to a mouse includes a base, a wheel module, a sheltering component and an optical detecting module. The base has a holder. The wheel module is disposed on the base and includes a roller and a wheel. The roller includes a rolling surface, an axle and a plurality of rib structures. The axle is rotatably disposed on the holder in an axle direction. The rib structures are disposed inside the rolling surface. The wheel is disposed on the rolling surface of the roller. The sheltering component includes light sheltering areas and light penetrating areas disposed on the roller or the wheel and around the axle direction. Each light sheltering area is perpendicular to the axle. The optical detecting module has an optical emitter and an optical receiver. The optical receiver is adapted to receive an optical signal emitted by the optical emitter.

6 Claims, 12 Drawing Sheets

(56) References Cited

U.S. PATENT DOCUMENTS

2014/0015752 A1* 1/2014 Lin .................... G06F 3/03543
             345/166
2014/0204030 A1* 7/2014 Li ..................... G06F 3/03543
             345/166

FOREIGN PATENT DOCUMENTS

GB        2 389 644 A    12/2003
TW         201821950 A    6/2018

* cited by examiner

WHEEL DEVICE APPLIED TO A MOUSE

BACKGROUND OF THE INVENTION

1. Field of the Invention

The present invention relates to a wheel device applied to a mouse, and more particularly, to a wheel device of the mouse utilizing optical detection technology to detect rotary information.

2. Description of the Prior Art

A roller module disposed on the top of the mouse is used to control a gesture applied for browsing the webpage. The user can control a rotary speed of the roller via fingers, and the rotary speed of the roller is relevant to a rolling speed of the webpage and information content that the user can watch within a short period.

The rotary speed of the roller is detected by an encoder, and a mechanical encoder is widespread applied to the mouse. Comparing to an optical grating encoder, the mechanical encoder of the conventional mouse has properties of simply structure, easy programmable control and specific hand feeling. The mechanical encoder includes a turntable. When the mouse roller rotates the turntable of the mechanical encoder, a plurality of terminals on the turntable is electrically connected with fixed terminals on a base of the mouse, and a conduction signal is generated accordingly.

The optical grating encoder includes an optical detection module (which has an optical emitter and an optical receiver) disposed on opposite sides of the optical grating structure. An optical signal emitted by the optical emitter can pass through and be sheltered by the optical grating structure in response to rotation of the mouse roller, so as to detect the rotary speed of the roller. An external optical code disk connected to the mouse roller via a gear or a shaft of the mouse can be used as the optical grating structure, and the optical detection module generates a series of optical signals in accordance with rotation of the optical code disk. Frequency of the optical signals corresponds to the rotary speed of the mouse roller.

With the advanced technology, design of the mouse utilizing the optical grating encoder to detect the rotary speed of the mouse roller with illumination function is an important issue in the related industry.

SUMMARY OF THE INVENTION

The present invention provides a wheel device of the mouse utilizing optical detection technology to detect rotary information for solving above drawbacks.

According to the claimed invention, a wheel device applied to a mouse includes a base, a wheel module, a sheltering component and an optical detecting module. The base includes a holder. The wheel module is disposed on the base. The wheel module includes a roller and a wheel. The roller includes a rolling surface, an axle and a plurality of rib structures. The axle is rotatably disposed on the holder in an axle direction. The plurality of rib structures is disposed inside the rolling surface. The wheel is disposed on an outside of the rolling surface. The sheltering component includes a plurality of light sheltering areas and a plurality of light penetrating areas. The plurality of light sheltering areas and the plurality of light penetrating areas are alternately disposed on the roller or the wheel around the axle direction. Each of the light sheltering areas is perpendicular to the axle. The optical detecting module includes an optical emitter and an optical receiver. The optical emitter is disposed on a first side of the wheel module and adapted to emit an optical signal. The optical receiver is disposed on a second side of the wheel module opposite to the first side, and adapted to receive the optical signal passing through the wheel module and the plurality of light penetrating areas on the sheltering component.

According to the claimed invention, a wheel device applied to a mouse includes a base, a wheel module, a sheltering component, a light emitting component and an optical detecting module. The base includes a holder. The wheel module is disposed on the base. The wheel module includes a roller and a transparent wheel. The roller includes an axle, a light guiding surface and a wall surface. The axle is rotatably disposed on the holder in an axle direction. The light guiding surface and the wall surface are respectively located on opposite sides of the axle and able to be coaxially rotated with the axle. The wall surface is perpendicular to the axle. The transparent wheel is disposed on an outside of the roller. The sheltering component includes a plurality of light sheltering areas and a plurality of light penetrating areas. The plurality of light sheltering areas and the plurality of light penetrating areas are alternately disposed on the roller or the wheel around the axle direction. The light emitting component is adapted to emit an illumination beam. At least a part of the illumination beam passes through the transparent wheel via reflection of the light guiding surface. The optical detecting module includes an optical emitter and an optical receiver. The optical emitter is disposed on a first side of the wheel module and adapted to emit an optical signal. The optical receiver is disposed on a second side of the wheel module opposite to the first side, and adapted to receive the optical signal passing through the wheel module and the plurality of light penetrating areas on the sheltering component.

According to the claimed invention, a wheel device applied to a mouse includes a base, a wheel module, a sheltering component, a light emitting component and an optical detecting module. The base includes a holder. The wheel module is disposed on the base. The wheel module includes two half rollers and a wheel. The two half rollers are rotatably disposed on the holder. The two half rollers individually include a light guiding surface. The wheel is disposed between the two half rollers and made by transparent material. The sheltering component includes a plurality of light sheltering areas and a plurality of light penetrating areas. The plurality of light sheltering areas and the plurality of light penetrating areas are alternately disposed on the wheel around an axle direction. The light emitting component is stretched into the wheel via one of the two half rollers and adapted to emit an illumination beam. At least a part of the illumination beam passes out of the wheel via reflection of the light guiding surface. The optical detecting module includes an optical emitter and an optical receiver. The optical emitter is disposed on a first side of the wheel module and adapted to emit an optical signal. The optical receiver is disposed on a second side of the wheel module opposite to the first side, and adapted to receive the optical signal passing through the wheel module and the plurality of light penetrating areas on the sheltering component.

The wheel mouse of the present invention disposes the low cost sheltering component on the roller or the wheel, to form the light sheltering areas and the light penetrating areas alternately arranged for intermittently sheltering a transmission path of the optical detecting module, and then rotation information of the wheel module and a related input command can be acquired. Arrangement of the light sheltering areas and the light penetrating areas on the sheltering component can be varied in accordance with a requirement of the outer annular region and the inner annular region. Material and a manufacturing method of the light sheltering area correspond to the position of the light sheltering area. The shape and position of the sheltering component can be adaptably adjusted according to the actual and design demands. The present invention has an advantage of high-level customized service about the optical grating structure, and the high cost roller can be matched with a variety of mice having different functions.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
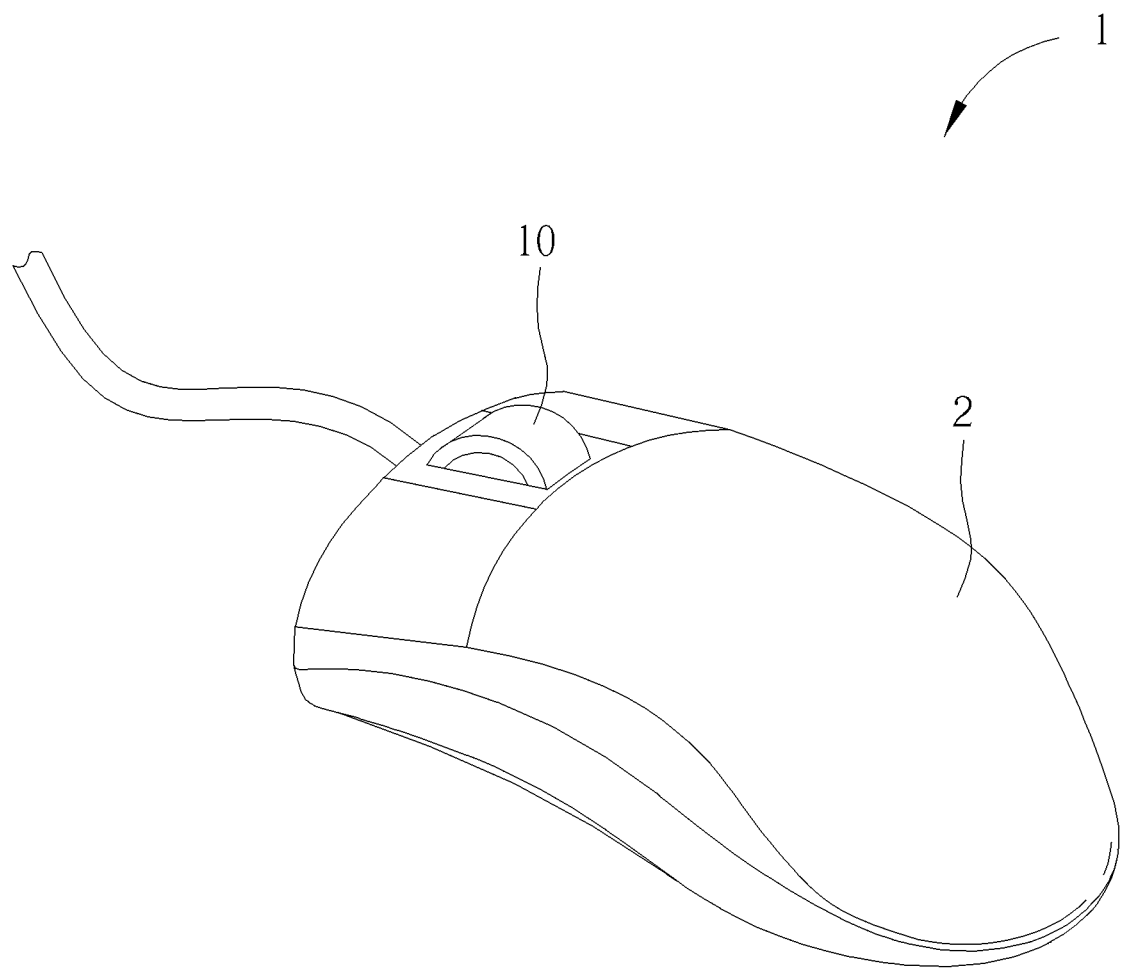
FIG. 1 is a diagram of a mouse according to an embodiment of the present invention.
Figure 2:
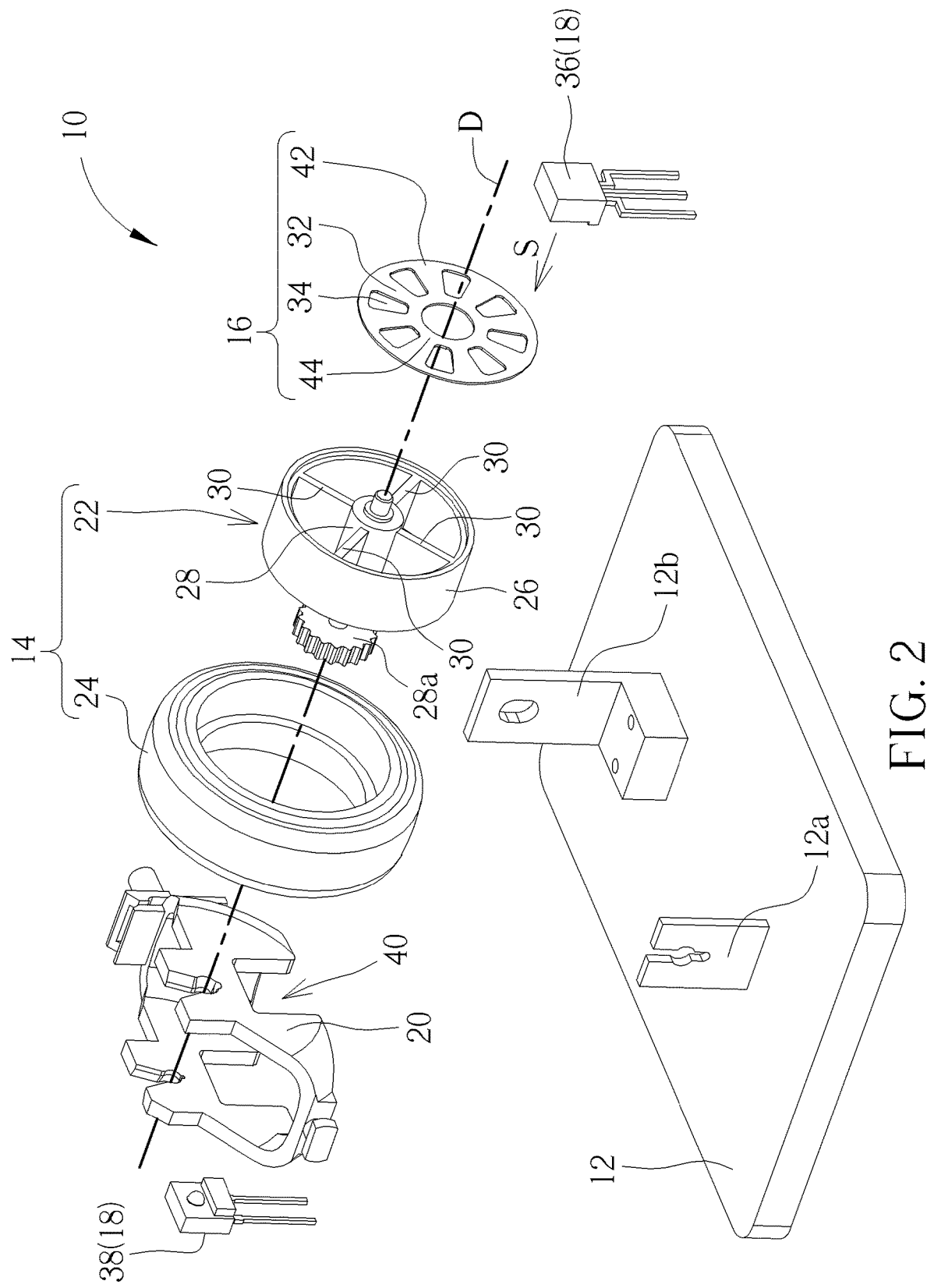
FIG. 2 is an exploded diagram of a wheel device according to a first embodiment of the present invention.
Figure 3:
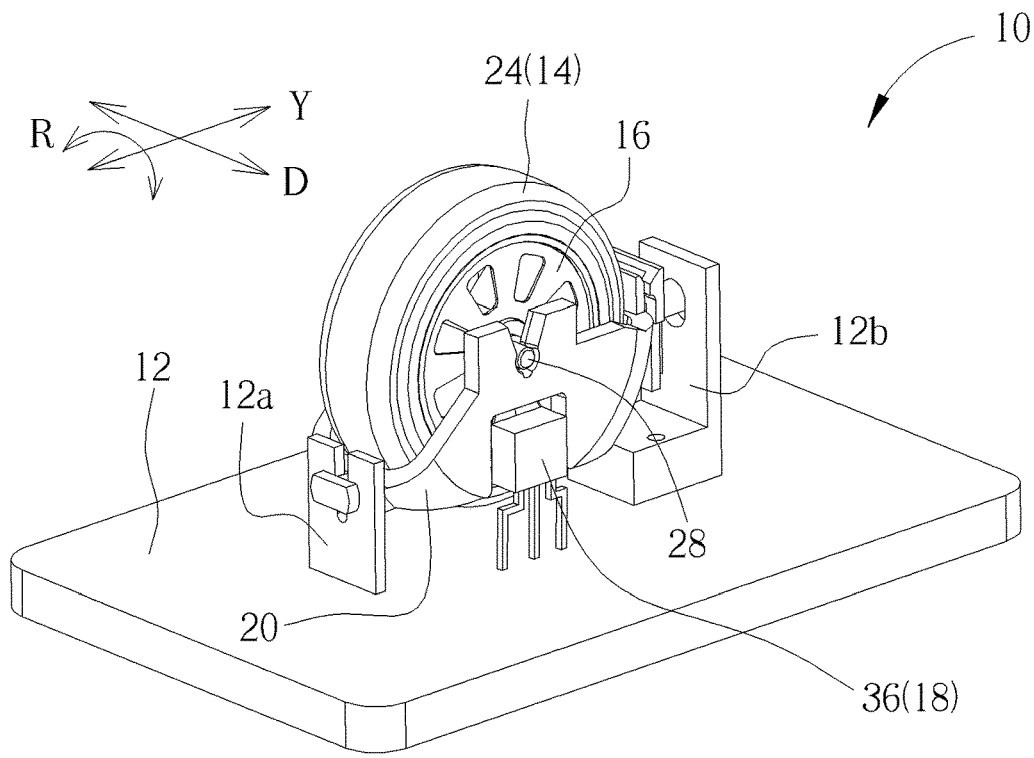
FIG. 3 and FIG. 4 are diagrams of the wheel device in different views according to the first embodiment of the present invention.
Figure 4:
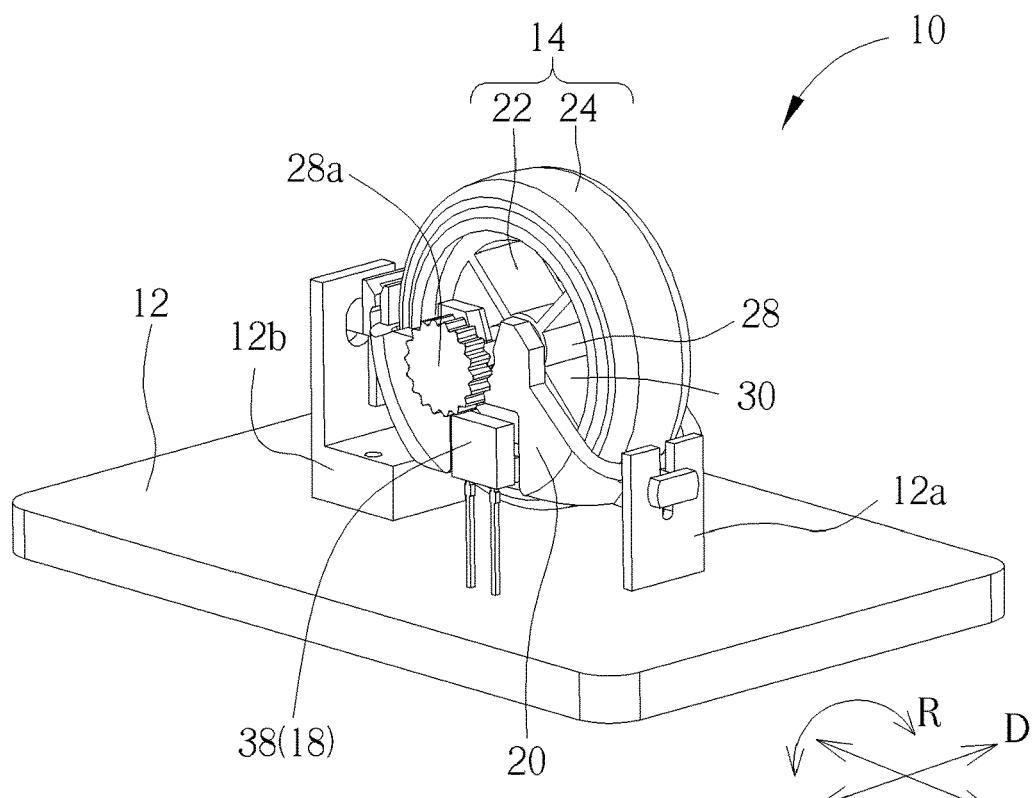

Please refer to FIG. 1 to FIG. 4. FIG. 1 is a diagram of a mouse 1 according to an embodiment of the present invention. FIG. 2 is an exploded diagram of a wheel device 10 according to a first embodiment of the present invention. FIG. 3 and FIG. 4 are diagrams of the wheel device 10 in different views according to the first embodiment of the present invention. The wheel device 10 can be disposed inside the mouse 1. Some part of the wheel device 10 may be exposed via an opening on a housing 2 for being touched by a user. The wheel device 10 can include a base 12, a wheel module 14, a sheltering component 16 and an optical detecting module 18. The base 12 can include a holder 20, and a top of the holder 20 is open to hold the wheel module 14. The holder 20 can be pivoted to a front supporter 12a and a rear supporter 12b of the base 12 in a vertical direction Y, so that the wheel module 14 and the holder 20 can be laterally rotated in a deflecting direction R. The base 12 may include a circuit board, which is not shown in the figures; or at least one part of the base 12 is designed as the circuit board.

The wheel module 14 can include a roller 22 and a hollow wheel 24. The roller 22 can include a rolling surface 26, an axle 28 and a plurality of rib structures 30. The plurality of rib structures 30 can be connected to the axle 28 and disposed inside the rolling surface 26. The axle 28 can be rotatably disposed on the holder 20 in an axle direction D. In the embodiment, the axle 28 can be a column-type bearing having a ratchet 28a. The axle 28 can be connected to the plurality of rib structures 30, and stretched to the outside of the roller 22 in the axle direction D to connect with the ratchet 28a. The ratchet 28a can be cooperated with additional adjustment components to provide a switching function about rolling modes and operation hand-feeling of the wheel module 14. In some possible embodiments, the rolling surface 26 of the roller 22 can be made by metal material, so that inertial rotation of the roller 22 can be executed in a high speed in response to operation of the wheel device 10; for example, a large browse range can be provided when the mouse 1 is used to browse a webpage. The wheel 24 can be disposed around the rolling surface 26 and be used as a touch interface of the wheel device 10.

The optical detecting module 18 can include an optical emitter 36 and an optical receiver 38, respectively disposed on a first side and a second side of the wheel module 14 opposite to each other. Arrangement of the optical emitter 36 and the optical receiver 38 is not limited to the embodiments shown in FIGS. 2-4, which means position of the optical emitter 36 and the optical receiver 38 can be exchanged. The holder 20 can have a hole 40, and an opening orientation of the hole 40 is not limited to the embodiments shown in FIGS. 2-4. An optical signal S projected by the optical emitter 36 can pass through the hole 40 on the holder 20, the wheel module 14 and the sheltering component 16, and then be received by the optical receiver 38. The optical signal S can be sheltered by a light sheltering area 32 and pass through the light penetrating area 34 alternately in response to rotation of the wheel module 14. The optical receiver 38 can acquire behavior information expressed by a gesture applied to the wheel module 14 in accordance with a receiving result, a receiving frequency and a receiving point of time about the optical signal S.

The sheltering component 16 can be used as an optical grating structure, and be formed by a plurality of light sheltering areas 32 and a plurality of light penetrating areas 34. The plurality of light sheltering areas 32 and the plurality of light penetrating areas 34 can be alternately disposed on the roller 22 or the wheel 24 around the axle direction D. Generally, the light sheltering area 32 can be perpendicular to the axle 28. The sheltering component 16 can further include an outer annular region 42 and an inner annular region 44. The outer annular region 42 can be connected to an outer side of each light sheltering area 32, and the inner annular region 42 can be connected to an inner side of each light sheltering area 32. In the embodiment, the sheltering component 16 can be an independent opaque sheet, which means the light sheltering area 32, the outer annular region 42 and the inner annular region 44 can be made by opaque material. The light penetrating area 34 can be a hollow region among the light sheltering area 32, the outer annular region 42 and the inner annular region 44. The sheltering component 16 can be fixed to a side of the roller 22. The outer annular region 42 of the sheltering component 16 can be attached to a lateral edge of the rolling surface 26 and/or connection between the rolling surface 26 and a lateral edge of an outer side of the rib structure 30. Some of the light sheltering areas 32 on the sheltering component 16 can be attached to each rib structure 30, so that the plurality of light sheltering areas 32 and the plurality of light penetrating areas 34 can be alternately disposed on the roller 22 or the wheel 24 around the axle direction D. The inner annular region 44 can be attached to a lateral edge of the axle 28 and/or connection between the axle 28 and a lateral edge of an inner side of the rib structure 30. The rib structure 30 may have no transparent property. A thickness of each rib structure 30 can be equal to or smaller than a width of each light sheltering area 32 on the sheltering component 16, so that transmission of the sheltering component 16 is affected by the light sheltering area 32 and the light penetrating area 34 instead of the rib structure 30.

In the first embodiment, the sheltering component 16 can be optionally attached to a side of the roller 22 and/or the wheel 24. If the sheltering component 16 is attached to the roller 22, the sheltering component 16 can be disposed on the lateral edge of the rib structure 30 via at least one of the light sheltering area 32, the outer annular region 42 and the inner annular region 44. The optical signal S emitted by the optical emitter 36 can pass through a gap between the rib structure 30 and the light penetrating area 34 on the sheltering component 16 to reach the optical receiver 38; in the meantime, the wheel 24 can be made by any material. If the sheltering component 16 is attached to the wheel 24, the sheltering component 16 can be disposed on the lateral surface of the wheel 24 via at least one of the light sheltering area 32, the outer annular region 42 and the inner annular region 44, and the wheel 24 preferably can be made by transparent material. In this embodiment, the sheltering component 16 can be directly formed on the lateral surface or an inner portion of the wheel 24, which depends on design demand.

An amount of the rib structure 30 is not limited to the embodiments shown in FIGS. 2-4, and any assembly of the rib structures 30 capable of stably supporting the rolling surface 26 on the axle 28 belongs to a design scope of the present invention. Amounts of the light sheltering area 32 and the light penetrating area 34 can be designed according to a sampling frequency and identification accuracy of the optical detecting module 18. The amount of the light sheltering area 32 can be equal to the amount of the light penetrating area 34. The amounts of the light sheltering area 32 and the light penetrating area 34 can be greater than or equal to the amount of the rib structure 30. The roller with the built-in optical grating structure is manufactured by a specific mold, which results in expensive cost and difficulty in amount adjustment of the grating structure. The manufacturing cost and the yield rate of the rib structure 30 of the roller 22 are limited to molding technology, and an amount of the optical signals capable of being detected by the optical detecting module 18 within one round of the wheel module 14 and the roller 22 is affected accordingly. This embodiment does not use the rib structure 30 as the optical grating structure; the amount of the optical signals received in each round of the wheel module 14 and the roller 22 is not limited to the rib structure 30, and therefore the wheel module 14 and the roller 22 with high manufacturing cost can be shared in a variety of mice. The present invention utilizes the sheltering component 16 with low manufacturing cost as the optical grating structure, so as to achieve aims of sharing the roller 22 and the high-level customized optical grating structure.

Figure 5:
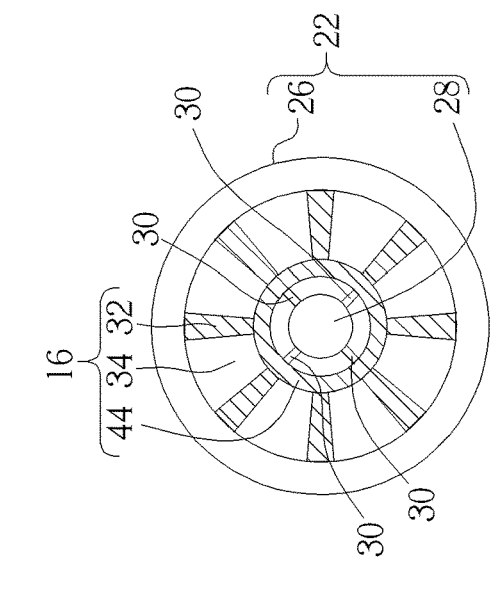
FIG. 5 to FIG. 7 are diagrams of a sheltering component and a roller according to different embodiments of the present invention.
Figure 6:
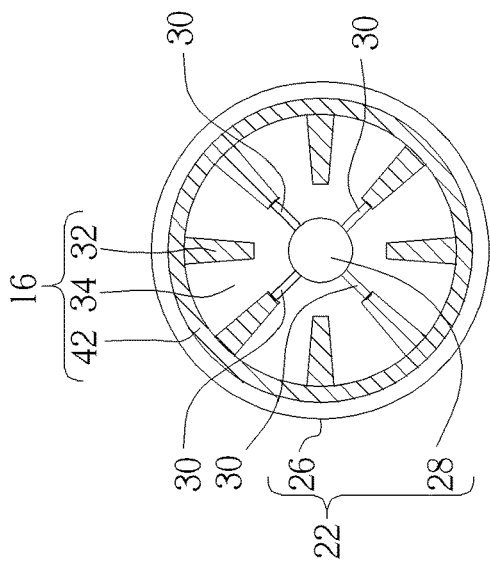
Figure 7:
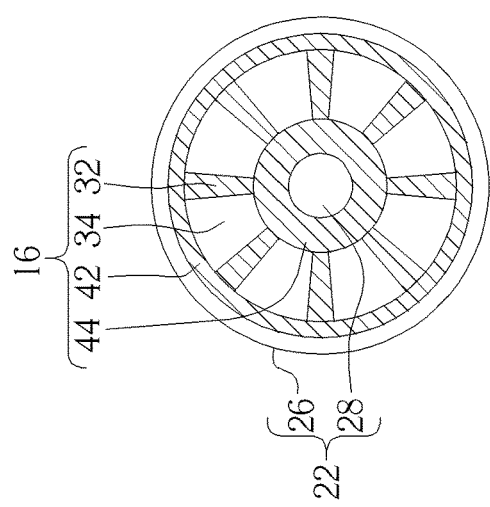
Figure 8:
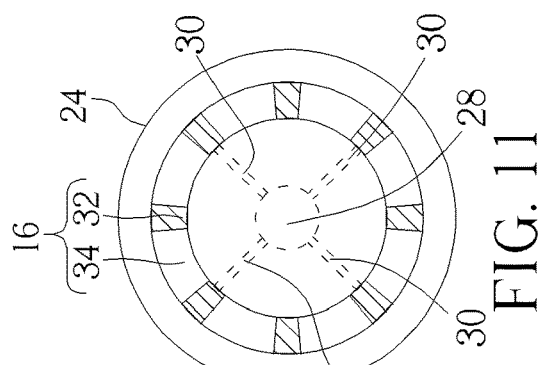
FIG. 8 to FIG. 11 are diagrams of the sheltering component and a wheel according to different embodiments of the present invention.
Figure 9:
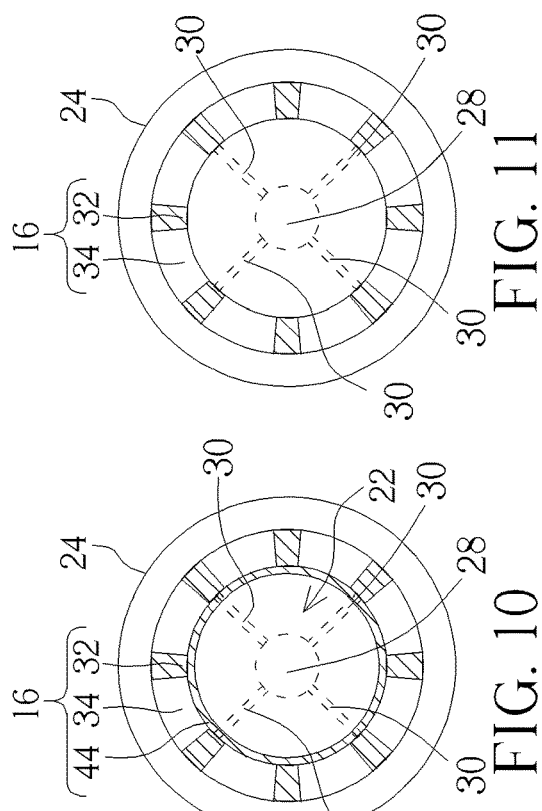

Please refer to FIG. 5 to FIG. 7. FIG. 5 to FIG. 7 are diagrams of the sheltering component 16 and the roller 22 according to different embodiments of the present invention. In the embodiment shown in FIG. 5, the sheltering component 16 can include the light sheltering area 32, the light penetrating area 34, the outer annular region 42 and the inner annular region 44. The outer annular region 42 can be disposed on a lateral side of the rolling surface 26 on the roller 22. The inner annular region 44 can be disposed on a lateral side of the axle 28 on the roller 22. The light sheltering area 32 can be connected between the outer annular region 42 and the inner annular region 44, and adapted to shelter the rib structure 30. In the embodiment shown in FIG. 6, the sheltering component 16 can only include the light sheltering area 32, the light penetrating area 34 and the outer annular region 42. The outer annular region 42 can be disposed on the lateral side of the rolling surface 26. The light sheltering area 32 can be stretched from the outer annular region 42 to inner of the outer annular region 42. Some of the light sheltering area 32 can be overlapped with the rib structure 30, and the other of the light sheltering area 32 does not overlap with the rib structure 30. In the embodiment shown in FIG. 7, the sheltering component 16 can only include the light sheltering area 32, the light penetrating area 34 and the inner annular region 44. The inner annular region 44 can be disposed on the lateral side of the axle 28. The light sheltering area 32 can be stretched from the inner annular region 44 to outside of the inner annular region 44. Some of the light sheltering area 32 can be overlapped with the rib structure 30, and the other of the light sheltering area 32 does not overlap with the rib structure 30.

Please refer to FIG. 8 to FIG. 11. FIG. 8 to FIG. 11 are diagrams of the sheltering component 16 and the wheel 24 according to different embodiments of the present invention. In the embodiment shown in FIG. 8, the sheltering component 16 can include the light sheltering area 32, the light penetrating area 34, the outer annular region 42 and the inner annular region 44. The outer annular region 42 and the inner annular region 44 can be respectively disposed on an outer edge and an inner edge of the lateral surface or the inner portion of the wheel 24. The light sheltering area 32 can be connected between the outer annular region 42 and the inner annular region 44. In the embodiment shown in FIG. 9, the sheltering component 16 can merely include the light sheltering area 32, the light penetrating area 34 and the outer annular region 42. The outer annular region 42 can be disposed on the outer edge of the lateral surface or the inner portion of the wheel 24. The light sheltering area 32 can be stretched from the outer annular region 42 into inner of the outer annular region 42 and be disposed on the wheel 24.

Figure 10:
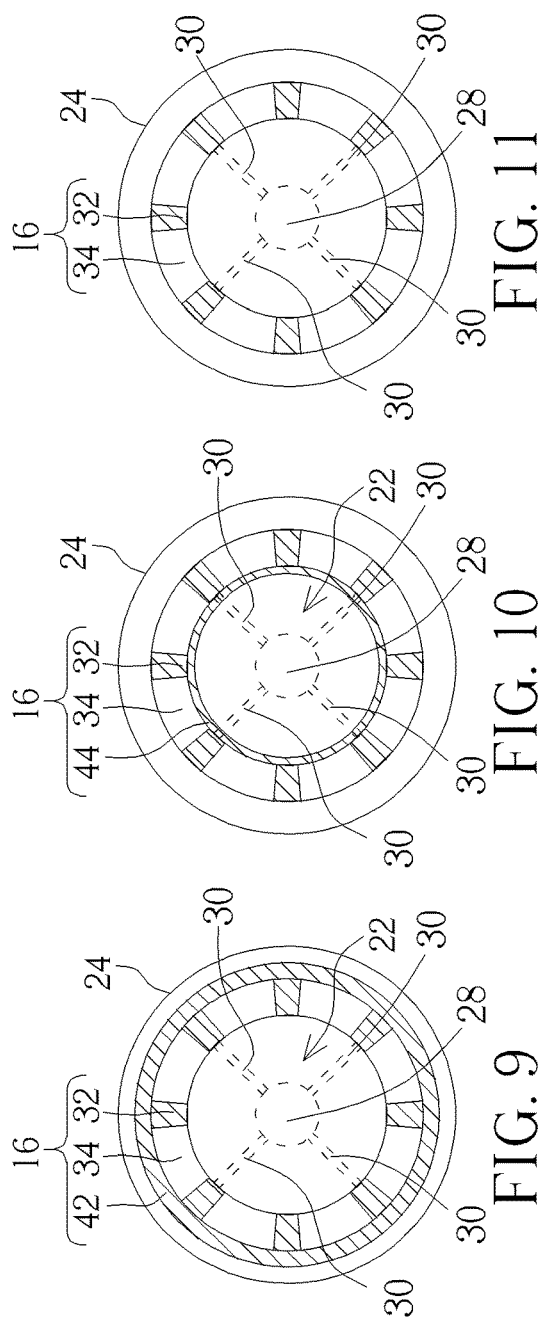
Figure 11:
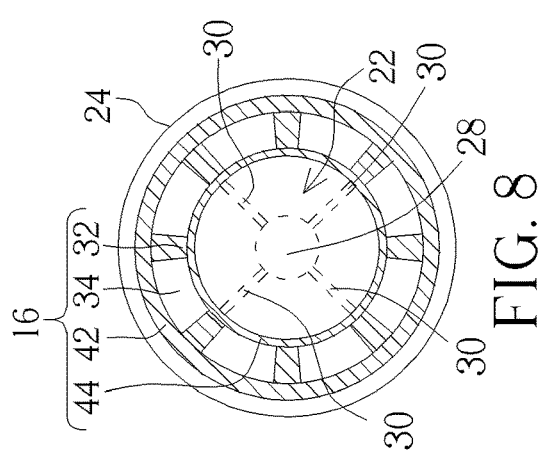

In the embodiment shown in FIG. 10, the sheltering component 16 can merely include the light sheltering area 32, the light penetrating area 34 and the inner annular region 44. The inner annular region 44 can be disposed on the inner edge of the lateral surface or the inner portion of the wheel 24. The light sheltering area 32 can be stretched from the inner annular region 44 to outside and disposed on the wheel 24. In the embodiment shown in FIG. 11, the sheltering component 16 can merely include the light sheltering area 32 and the light penetrating area 34. The light sheltering area 32 can be disposed on the lateral surface or the inner portion of the wheel 24. The light penetrating area 34 can be space between the adjacent light sheltering areas 32. In the above-mentioned embodiments, the sheltering component 16 can be adhered to the side of the roller 22 or the wheel 24 if the sheltering component 16 is the independent opaque sheet. As if the wheel 24 is made by transparent material, the sheltering component 16 can be not only the independent opaque sheet, but also a light sheltering ink layer coating on the transparent wheel 24 or an opaque laser marking metamorphic layer generated when the transparent wheel 24 is processed.

In the above-mentioned embodiments shown in FIGS. 2-11, the holder 20 and the wheel 24 are transparent, and the wheel device 10 can further include a light emitting component (which is not shown in the figures) disposed adjacent to an outer portion of the holder 20. The light emitting component can emit an illumination beam, and the illumination beam can move upward to pass through the wheel device 10 in response to partial refraction and partial reflection of the holder 20 and the wheel 24.

Figure 12:
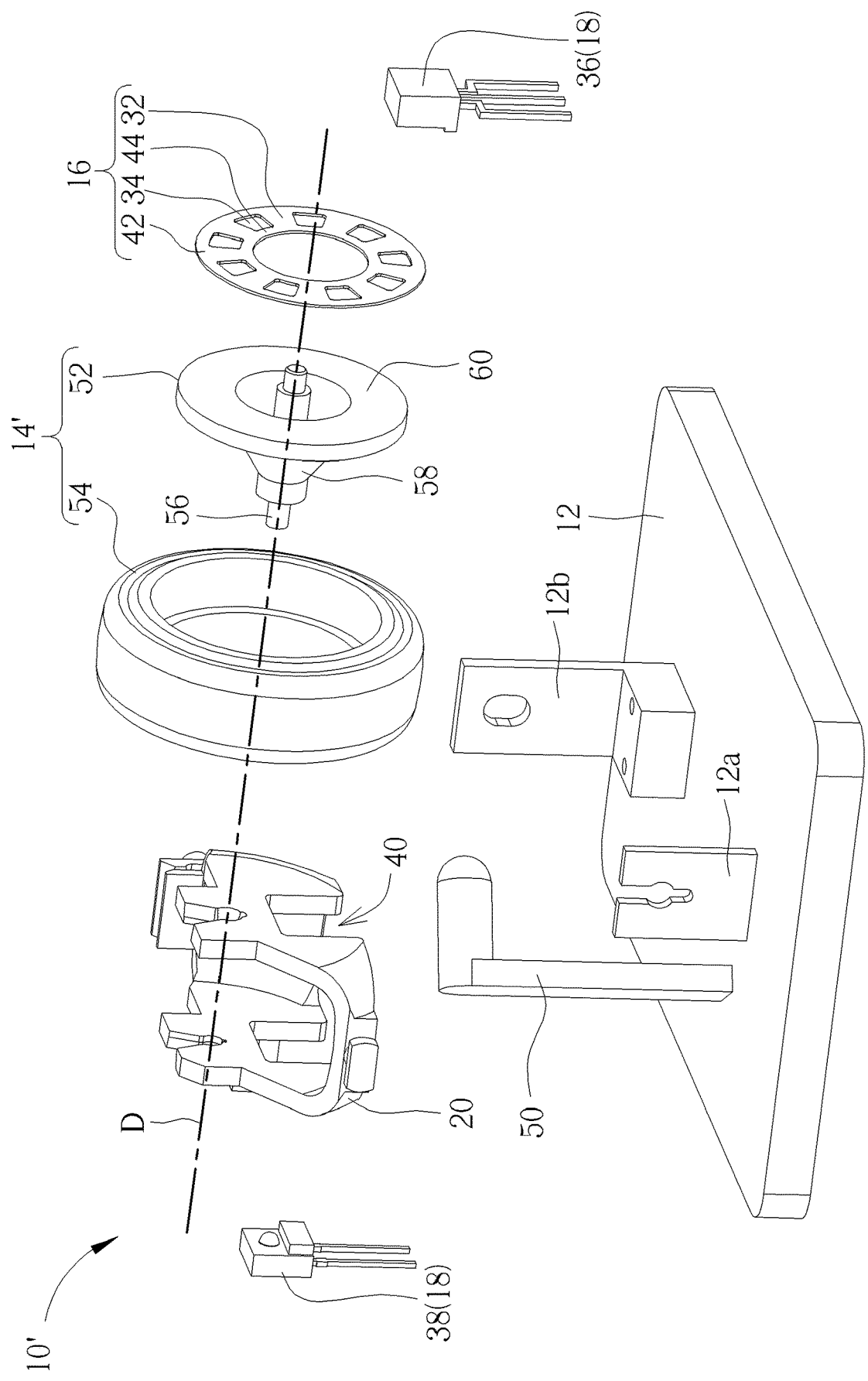
FIG. 12 is an exploded diagram of the wheel device according to a second embodiment of the present invention.
Figure 13:
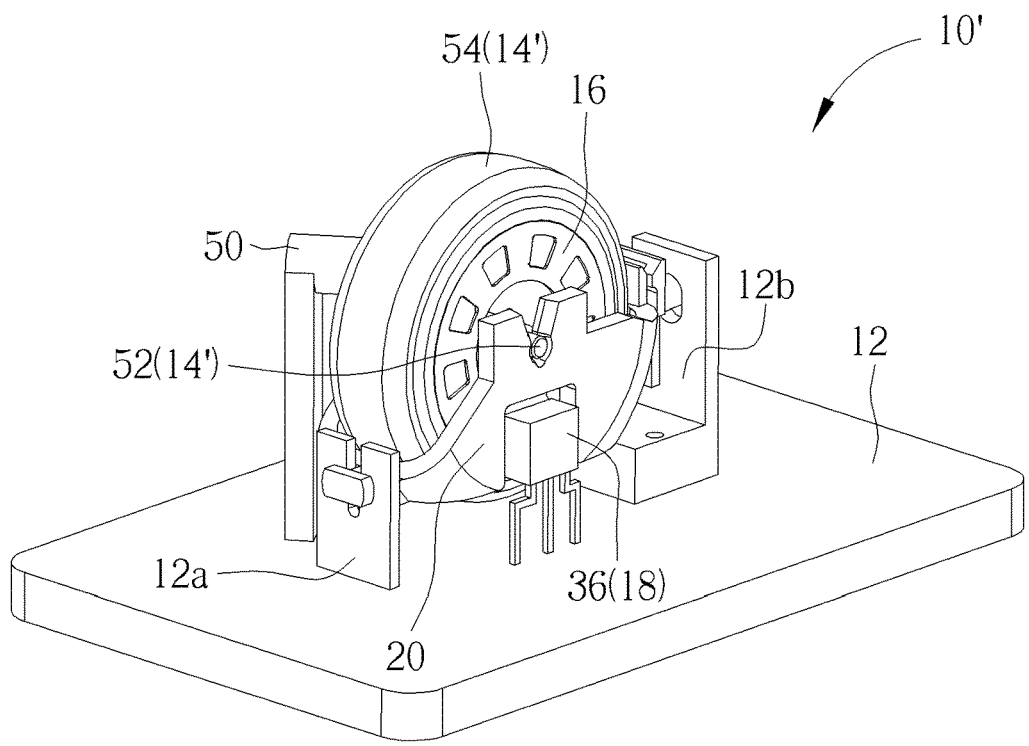
FIG. 13 and FIG. 14 are diagrams of the wheel device in different views according to the second embodiment of the present invention.
Figure 14:
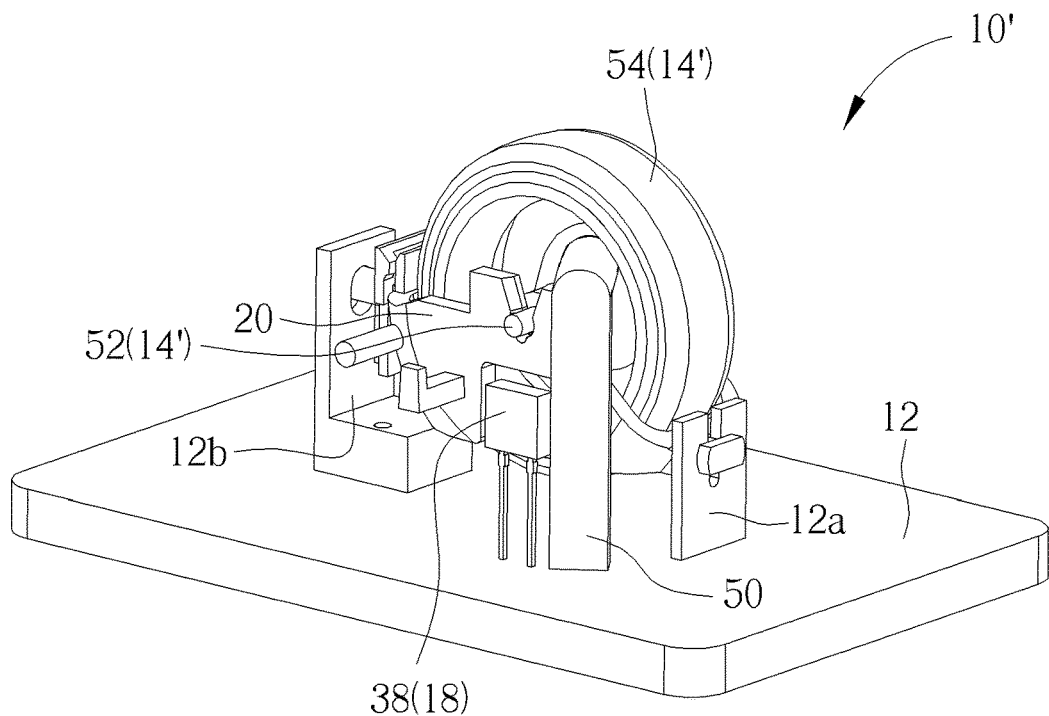

Please refer to FIG. 12 to FIG. 14. FIG. 12 is an exploded diagram of the wheel device 10' according to a second embodiment of the present invention. FIG. 13 and FIG. 14 are diagrams of the wheel device 10' in different views according to the second embodiment of the present invention. In the second embodiment, elements having the same numerals as one of the first embodiment have the same structures and functions, and a detailed description is omitted herein for simplicity. Difference between the first embodiment and the second embodiment is: the wheel device 10' can further include a light emitting component 50 electrically connected to a circuit board (which is not shown in the figures) of the base 12. In addition, the wheel module 14' of the wheel device 10' can include a roller 52 and a transparent wheel 54. The transparent wheel 54 can be assembled with the roller 52 to rotatably dispose on the holder 20. The light emitting component 50 can emit the illumination beam to the inner portion of the transparent wheel 54, and then the illumination beam can pass through the transparent wheel 54 via reflection so that the transparent wheel 54 can illuminate.

The roller 52 can include an axle 56, a light guiding surface 58 and a wall surface 60. The axle 56 can be a cylinder-type bearing, which can be rotatably disposed on the holder 20 in the axle direction D. The light guiding surface 58 and the wall surface 60 can be respectively disposed on opposite sides of the axle 56, and can be coaxially rotated around the axle 56. In the preferred embodiment, the light guiding surface 58 can be a conical surface, and an edge of a section of the conical surface can be a straight line or an arc, and the wall surface 60 can be perpendicular to the axle 56, which depend on an actual demand. The light guiding surface 58 and the wall surface 60 are transparent, and a reflection coefficient of the light guiding surface 58 can be increased by surface process. The transparent wheel 54 can be disposed on an outer of the roller 52. A lighting portion of the light emitting component 50 can stretch into the transparent wheel 54, or be located outside of the transparent wheel 54 and points toward the inner portion of the transparent wheel 54. The light emitting component 50 can be a light emitting diode or any light source sited at the elevated lighting portion, or the light source sited at other position of the light emitting component 50 and then the lighting portion can receive the beam via a light guiding component. At least some part of the illumination beam provided by the light emitting component 50 can illuminate the roller 52 inside the transparent wheel 54, and the said illumination beam can pass through the transparent wheel 54 from inside to outside via reflection of the light guiding surface 58 of the roller 52, which means the wheel device 10' can illuminate.

If the sheltering component 16 of the wheel device 10' is the independent opaque sheet, the sheltering component 16 can be attached to the lateral surface of the transparent wheel 54. If the sheltering component 16 is the independent opaque sheet and the roller 52 is made by the transparent material, the sheltering component 16 can be attached to the lateral surface of the roller 56 and/or the transparent wheel 54. Besides, when the roller 52 is made by the transparent material, the light sheltering area 32 of the sheltering component 16 can be the light sheltering ink layer formed on the light guiding surface 58, the wall surface 60 or the inner portion of the roller 52. Furthermore, the light sheltering area 32 may be the opaque laser marking metamorphic layer formed on the light guiding surface 58, the wall surface 60 or the inner portion of the roller 26. Accordingly, the light sheltering area 32 of the sheltering component 16 can be the light sheltering ink layer or the opaque laser marking metamorphic layer formed by the processed transparent wheel 54.

The sheltering component 16 in the second embodiment can have some variation similar to the first embodiment shown in FIG. 8 to FIG. 11. If the sheltering component 16 includes the light sheltering area 32, the light penetrating area 34, the outer annular region 42 and the inner annular region 44, the outer annular region 42 and the inner annular region 44 can be respectively disposed on the outer edge and the inner edge of the lateral surface of the roller 52 or the transparent wheel 54, and the light sheltering area 32 can be connected between the outer annular region 42 and the inner annular region 44, and the light penetrating area 34 can be the space between the adjacent light sheltering areas 32. If the sheltering component 16 only includes light sheltering area 32, the light penetrating area 34 and the outer annular region 42, the outer annular region 42 can be disposed on the outer edge of the lateral surface of the roller 52 or the transparent wheel 54, and the light sheltering area 32 can be stretched from the outer annular region 42 to inner of the outer annular region 42, and the light penetrating area 34 can be the space between the adjacent light sheltering areas 32. If the sheltering component 16 only includes the light sheltering area 32, the light penetrating area 34 and the inner annular region 44, the inner annular region 44 can be disposed on the inner edge of the lateral surface of the roller 52 or the transparent wheel 54, and the light sheltering area 32 can be stretched from the inner annular region 44 to outside of the inner annular region 44, and the light penetrating area 34 can be the space between the adjacent light sheltering areas 32. If the sheltering component 16 only includes the light sheltering area 32 and the light penetrating area 34, the light sheltering area 32 can be disposed on the lateral surface of the roller 52 or the transparent wheel 54.

Figure 15:
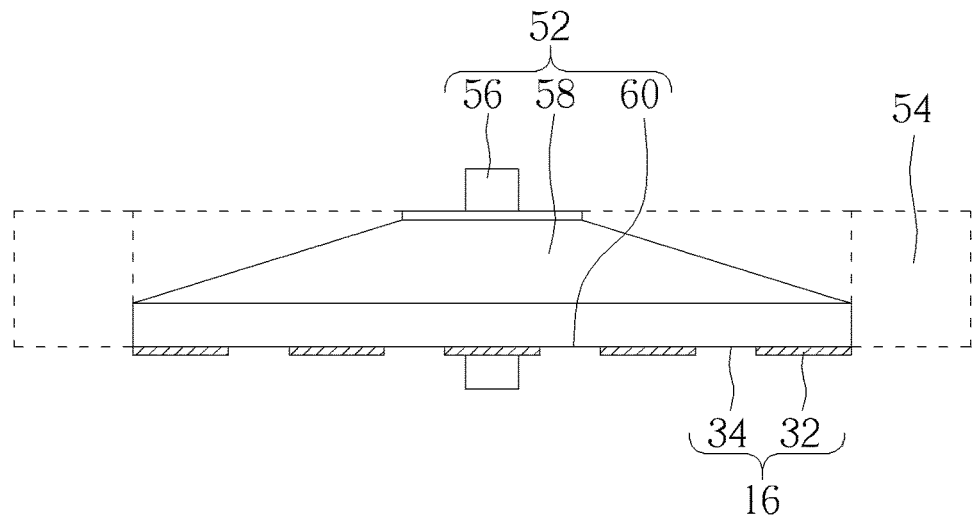
FIG. 15 to FIG. 17 are diagrams of the sheltering component and the roller according to different embodiments of the present invention.
Figure 16:
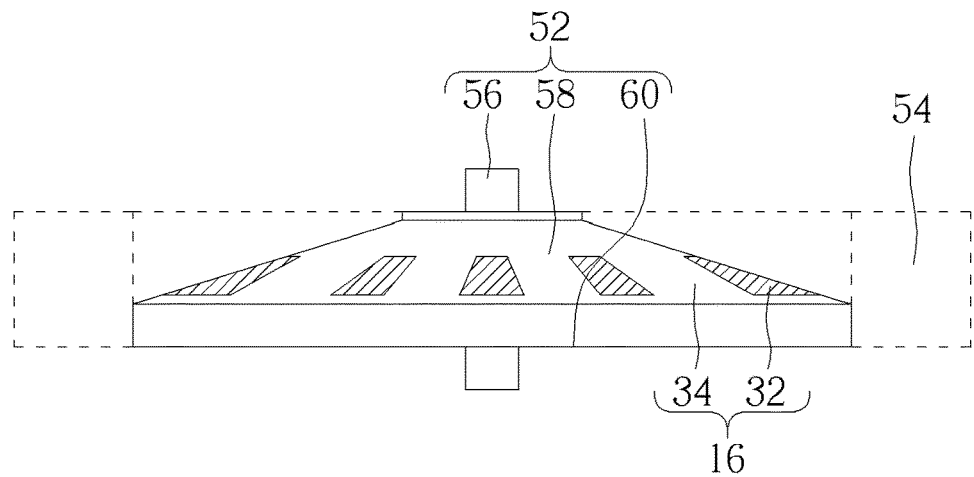
Figure 17:
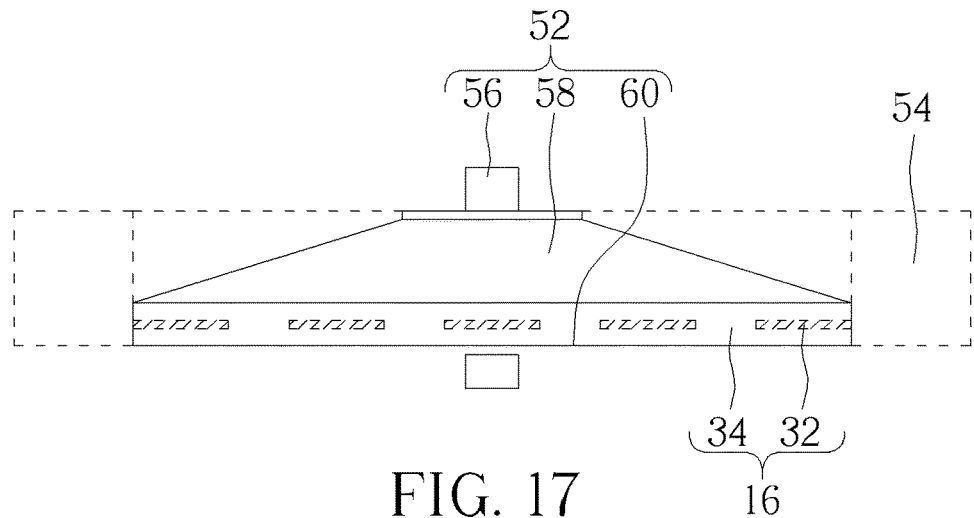
Figure 18:
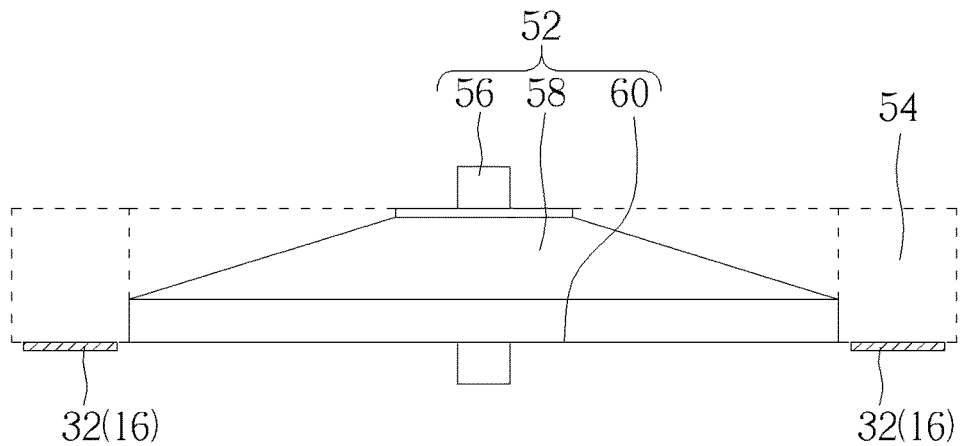
FIG. 18 to FIG. 20 are diagrams of the sheltering component and a hollow transparent wheel according to different embodiments of the present invention.
Figure 19:
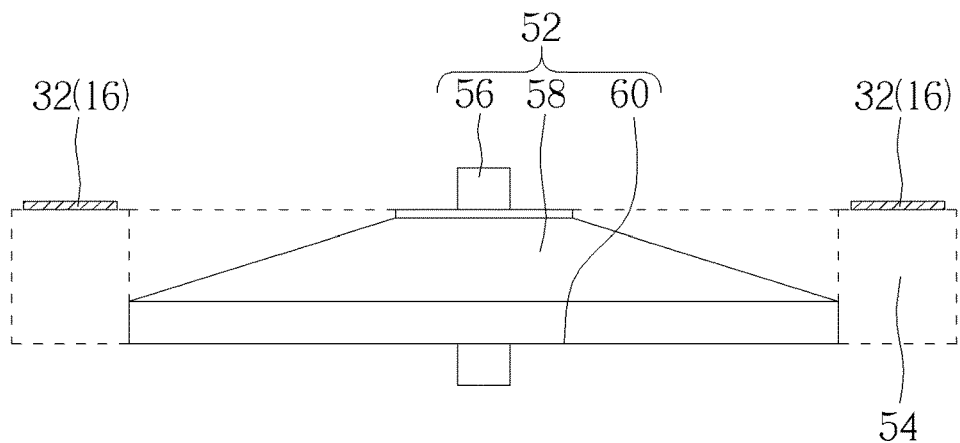
Figure 20:
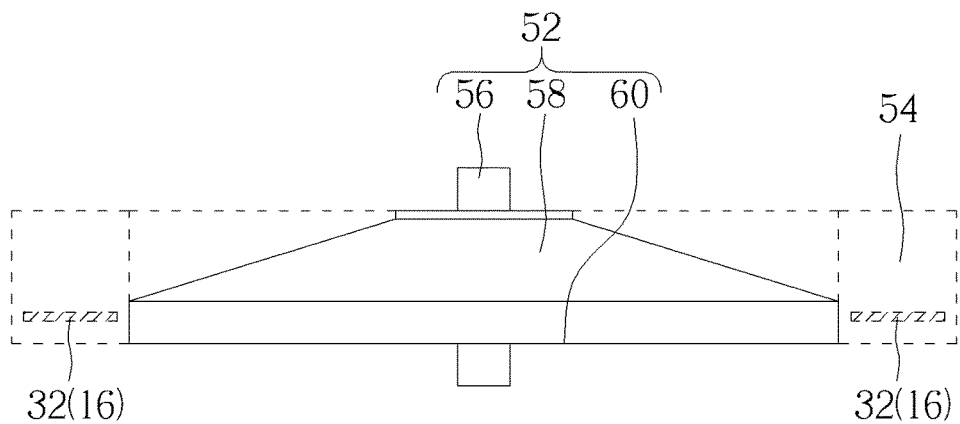

Please refer to FIG. 15 to FIG. 20. FIG. 15 to FIG. 17 are diagrams of the sheltering component 16 and the roller 52 according to different embodiments of the present invention. FIG. 18 to FIG. 20 are diagrams of the sheltering component 16 and the hollow transparent wheel 54 according to different embodiments of the present invention. As shown in FIG. 15, the light sheltering area 32 of the sheltering component 16 can be the light sheltering ink layer or the opaque laser marking metamorphic layer disposed on the wall surface 60 of the roller 52, and the light sheltering area 32 can be perpendicular to the axle 56. As shown in FIG. 16, the light sheltering area 32 of the sheltering component 16 can be the light sheltering ink layer or the opaque laser marking metamorphic layer disposed on the light guiding surface 58 of the roller 52, and the light sheltering area 32 is not perpendicular to the axle 56. As shown in FIG. 17, the light sheltering area 32 of the sheltering component 16 can be the opaque laser marking metamorphic layer disposed on the inner portion of the roller 52, such as somewhere between the light guiding surface 58 and the wall surface 60, and the light sheltering area 32 can be or not be perpendicular to the axle 56 optionally.

As shown in FIG. 18, the light sheltering area 32 of the sheltering component 16 can be the light sheltering ink layer or the opaque laser marking metamorphic layer disposed on a first side of the transparent wheel 54 adjacent to the wall surface 60 or facing the optical emitter 36, and the light sheltering area 32 can be perpendicular to the axle 56. As shown in FIG. 19, the light sheltering area 32 of the sheltering component 16 can be the light sheltering ink layer or the opaque laser marking metamorphic layer disposed on a second side of the transparent wheel 54 facing the optical receiver 38 or adjacent to the light guiding surface 58; the first side can be opposite to the second side, and the light sheltering area 32 can be perpendicular to the axle 56. As shown in FIG. 20, the light sheltering area 32 of the sheltering component 16 can be the opaque laser marking metamorphic layer disposed on the inner portion of the transparent wheel 54, such as some position between the first side and the second side, and the light sheltering area 32 can be or not be perpendicular to the axle 56 optionally. In the above-mentioned embodiments, the light penetrating area 34 of the sheltering component 16 can be the space between the adjacent light sheltering areas 32.

Figure 21:
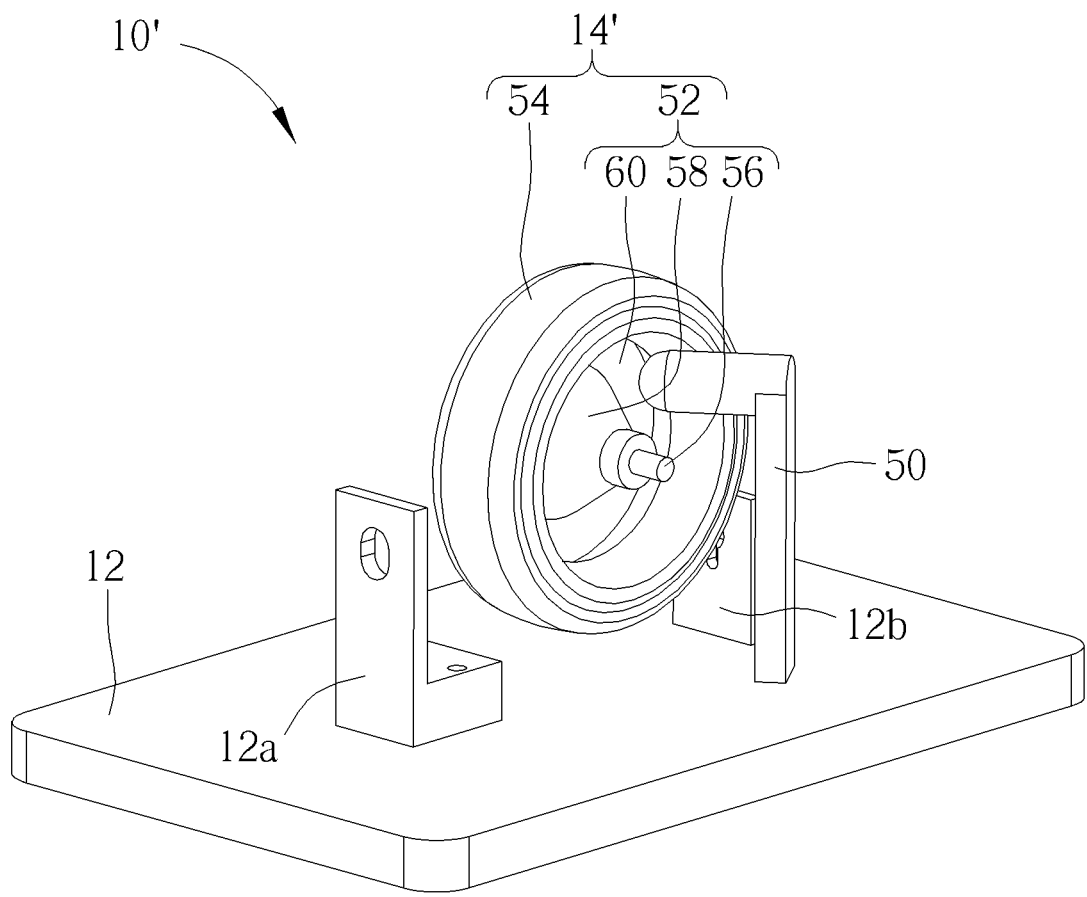
FIG. 21 is a diagram of a part of the wheel device according to the second embodiment of the present invention.

Please refer to FIG. 21. FIG. 21 is a diagram of a part of the wheel device 10' according to the second embodiment of the present invention. The wall surface 60 of the roller 52 can be perpendicular to the axle 56, so that a side of a hollow chamber of the transparent wheel 54 can be sheltered. The light guiding surface 58 of the roller 52 can be accommodated inside the hollow chamber of the wheel 54, and the illumination beam emitted by the light emitting component 50 can be reflected by the light guiding surface 58 to make illumination of the transparent wheel 54. In the second embodiment, the light guiding surface 58 can be designed as a cone structure, and a height, a width, an inclined angle and other structural parameters of the cone structure are not limited to the embodiment shown in FIG. 21, which depend on the design demand. In addition, a shape of the light guiding surface 58 is not limited to the cone structure shown in FIG. 21, and any sectional shape of the light guiding surface capable of uniformly reflecting the illumination beam toward top of the transparent wheel 54 can conform to the design demand of the light guiding surface 58 in the present invention. Generally, the roller 52 and the wheel 54 without empty space cannot be used as the optical grating structure. In this embodiment, when the sheltering component 16 is disposed on the wall surface 60 of the roller 52, the wall surface 60 and the optical emitter 36 of the optical detecting module 18 can be located on the same side (such as the first side) of the wheel module 14, and the optical receiver 38 and the light guiding surface 58 can be located on the same side (such as the second side) of the wheel module 14. The optical signal S emitted by the optical emitter 36 can pass through the wall surface 60 and the light guiding surface 58 of the roller 52 and the sheltering component 16 in sequence, or can pass through the wall surface 60, the sheltering component 16 and the light guiding surface 58 in sequence, or can pass through the sheltering component 16, the wall surface 60 and the light guiding surface 58 in sequence, so as to be received by the optical receiver 38. Thus, the optical signal S can be transmitted into the wall surface 60 and then out of the transparent wheel 54 via the light guiding surface 58, so that the roller 52, which lacks of the empty space and has the opaque light guiding surface 58, can be assembled with the sheltering component 16 for being the optical grating structure.

Figure 22:
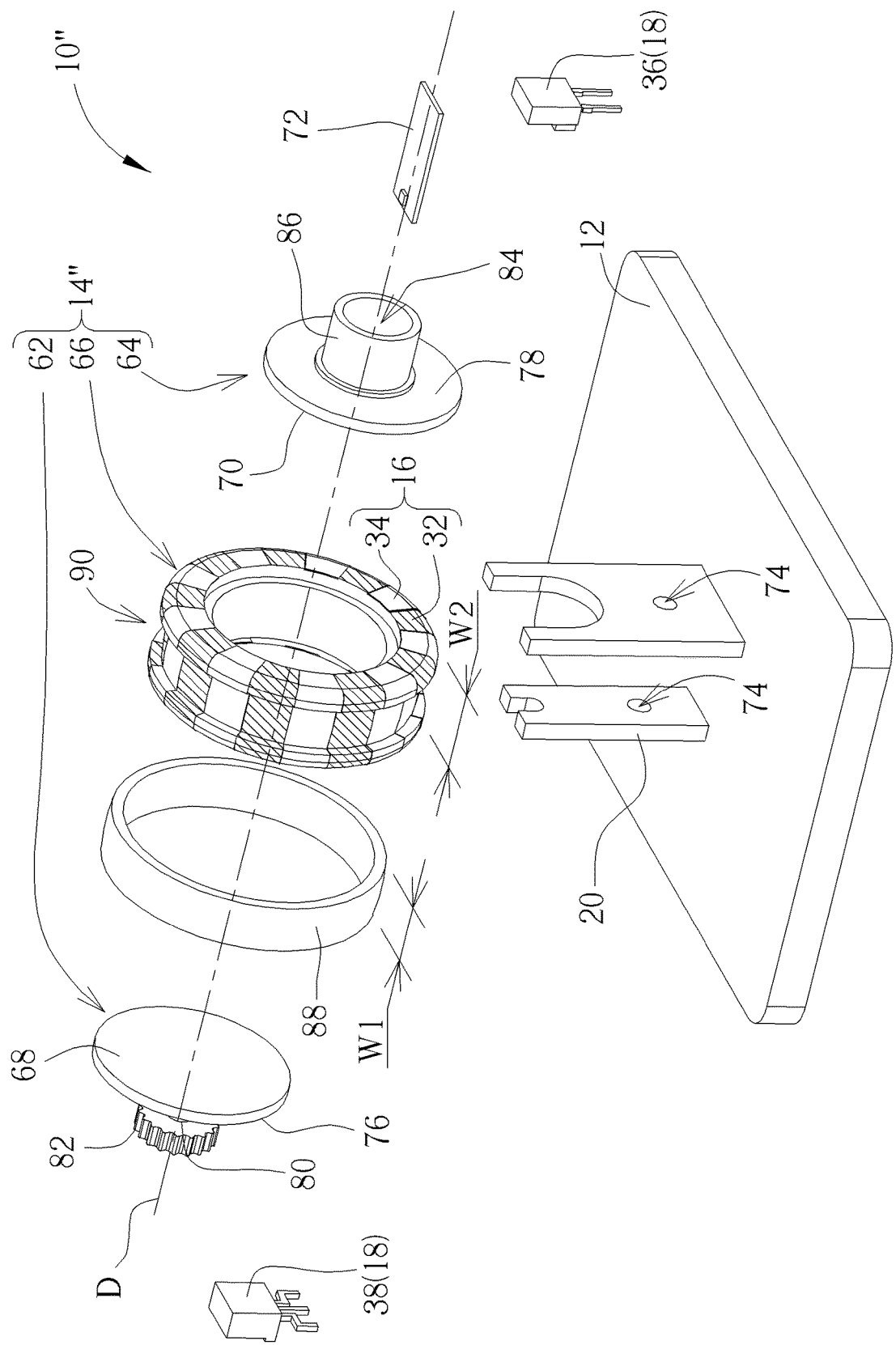
FIG. 22 is an exploded diagram of the wheel device according to a third embodiment of the present invention.
Figure 23:
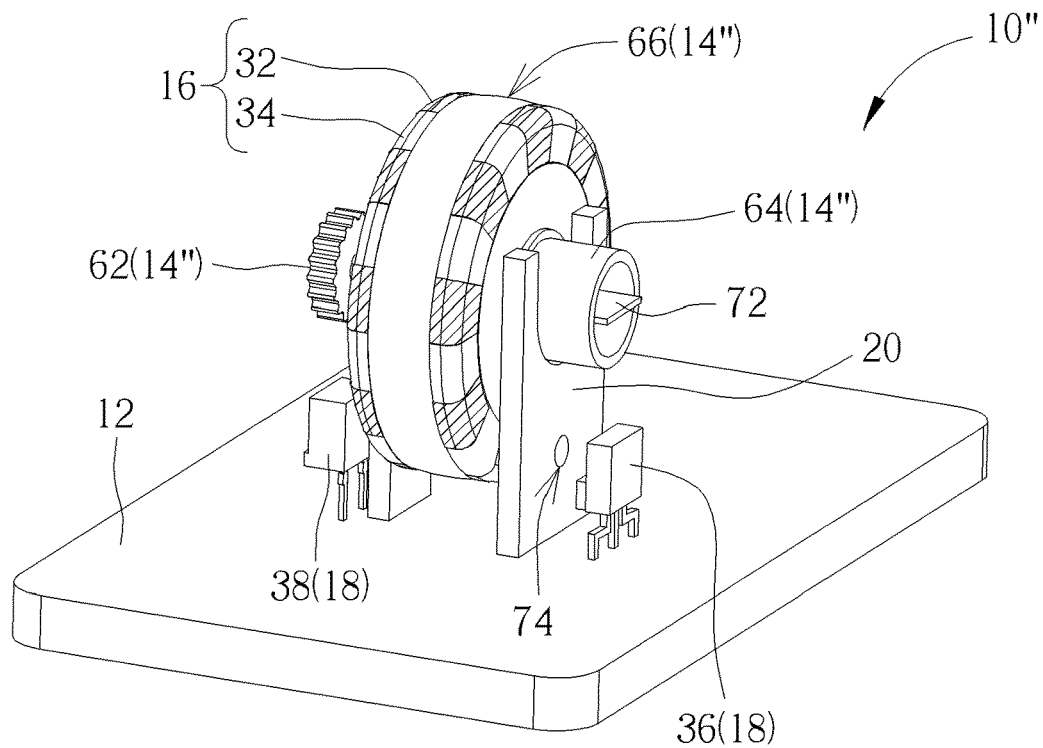
FIG. 23 and FIG. 24 are diagrams of the wheel device in different views according to the third embodiment of the present invention.
Figure 24:
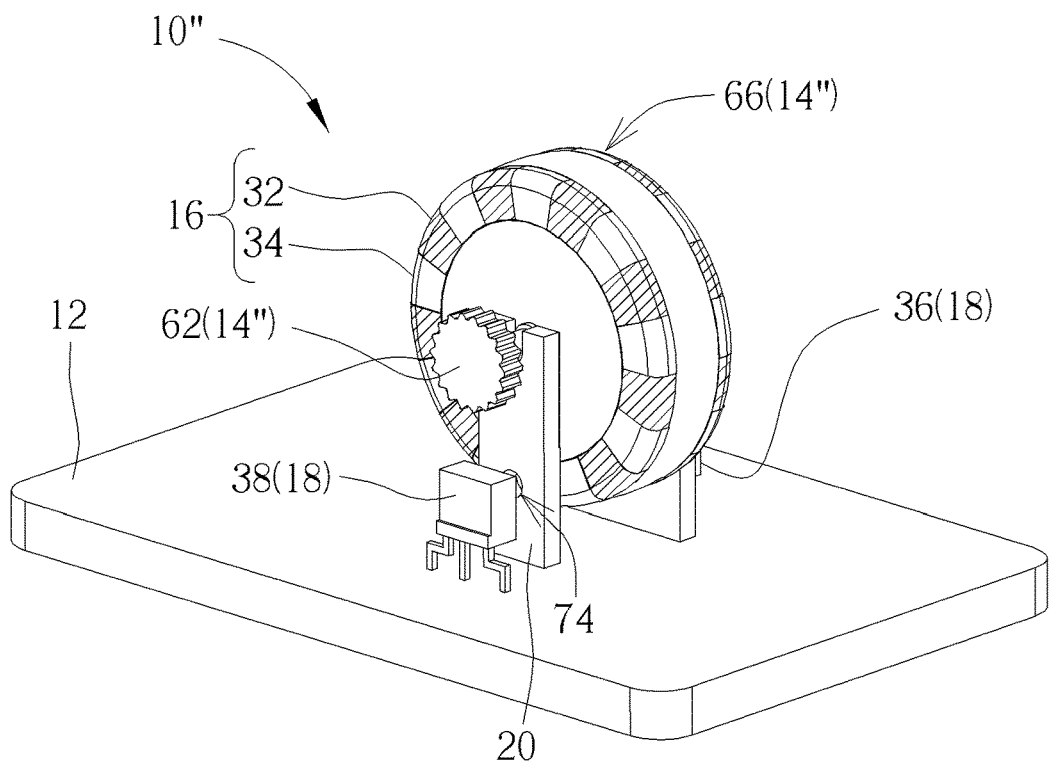

Please refer to FIG. 22 to FIG. 24. FIG. 22 is an exploded diagram of the wheel device 10" according to a third embodiment of the present invention. FIG. 23 and FIG. 24 are diagrams of the wheel device 10" in different views according to the third embodiment of the present invention. In the third embodiment, the elements having the same numerals as ones of the above-mentioned embodiments have the same structures and functions, and a detailed description is omitted herein for simplicity. Difference between the third embodiment and the above-mentioned embodiments is: the wheel module 14" of the wheel device 10" can include a first half roller 62, a second half roller 64 and a hollow wheel 66. The first half roller 62 and the second half roller 64 can be rotatably disposed on the holder 20. The first half roller 62 can have a first light guiding surface 68, and the second half roller 64 can have a second light guiding surface 70. The wheel 66 can be made by the transparent material, and disposed between the first half roller 62 and the second half roller 64. The light emitting component 72 of the wheel device 10" can insert into the wheel 66 though at least one of the first half roller 62 and the second half roller 64 optionally. At least some part of the illumination beam emitted by the light emitting component 72 can pass through the wheel 66 via reflection of the first light guiding surface 68 and the second light guiding surface 70, so that the wheel device 10" can illuminate.

Besides, the holder 20 can further have a hole 74, and the optical signal S emitted by the optical emitter 36 can be received by the optical receiver 38 through the hole 74. The first half roller 62 can have a first roller wall 76 perpendicular to the axle direction D. The second half roller 64 can have a second roller wall 78 perpendicular to the axle direction D. The first light guiding surface 68 can be an inner surface of the first roller wall 76. The second light guiding surface 70 can be an inner surface of the second roller wall 78. An axle 80 can be stretched from the first roller wall 76 and have a ratchet 82. An axle sleeve 86 with a penetrating aperture 84 can be stretched from the second roller wall 78. The first roller wall 76 and the second roller wall 78 can be respectively disposed on two opposite sides of the wheel 66, and rotatably disposed on the holder 20 via the axle 80 and/or the axle sleeve 86. The ratchet 82 can be operated with an auxiliary component for providing the switching function about the rolling modes and the operation hand-feeling of the wheel module 14. The light emitting component 72 can insert into the hollow chamber inside the wheel 66 via the penetrating aperture 84.

The sheltering component 16 of the wheel device 10" can be directly formed on the rolling surface, the lateral surface and/or the inner portion of the transparent wheel 66; as shown in FIG. 22 to FIG. 24, the rolling surface and the lateral surface of the wheel 66 both have the sheltering component 16. The light sheltering area 32 of the sheltering component 16 can be the light sheltering ink layer or the opaque laser marking metamorphic layer formed on the wheel 66 made by the transparent material, so that some regions of the transparent wheel 66 can shelter the beams.

The light penetrating area 34 of the sheltering component 16 can be other regions of the transparent wheel 66 not belonging to the light sheltering area 32.

Further, the wheel module 14" may optionally include a tire 88 disposed on an annular slot 90 of the rolling surface on the wheel 66. Elasticity of the tire 88 can be cooperated with an axially clipping force of the first half roller 62 and the second half roller 64 applied to the wheel 66 for providing a binding force onto the wheel 66 in its radial direction. Moreover, the tire 88 may have some microstructures or be processed by surface treatment, and the related wheel 66 can provide a variety of touch feeling or friction difference for the user's finger. A width W1 of the tire 88 can be preferably smaller than a width W2 of the wheel 66, which means the tire 88 is partly accommodated inside the annular slot 90 of the wheel 66, so as to align an outer surface of the tire 88 with an outer edge of the wheel 66. If the tire 88 of the wheel module 14" is installed inside the annular slot 90 of the wheel 66, the sheltering component 16 of the wheel device 10" can be directly formed on not only the rolling surface, the lateral surface and/or the inner portion of the wheel 66, but also inside the annular slot 90; in this embodiment, the light sheltering area 32 of the sheltering component 16 can be the light sheltering ink layer or the opaque laser marking metamorphic layer.

Figure 25:
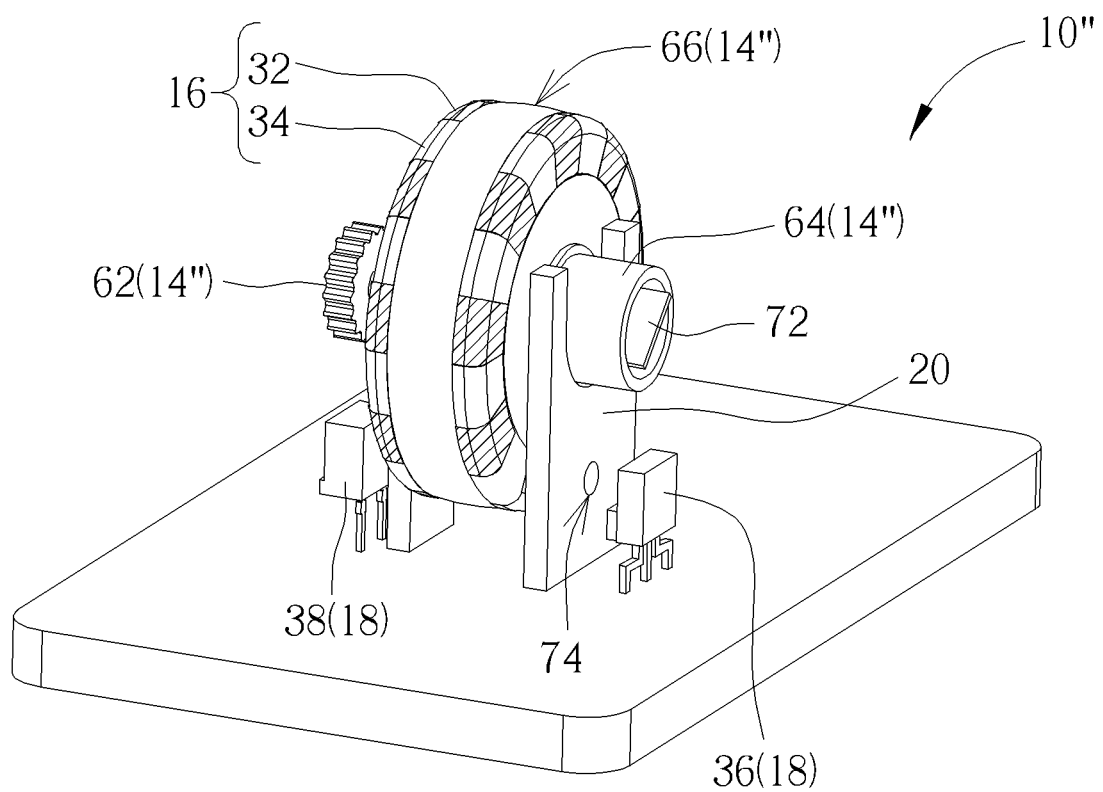
FIG. 25 is a diagram of the wheel device in another type according to the third embodiment of the present invention.

In the third embodiment, an installation angle of the light emitting component 72 is not limited to a type shown in FIG. 22 to FIG. 24, and an inclination angle of the light emitting component 72 can be varied according to position of the wheel device 10" on the housing 2 of the mouse 1. Please refer to FIG. 23 to FIG. 25. FIG. 25 is a diagram of the wheel device 10" in another type according to the third embodiment of the present invention. In the embodiment shown in FIG. 23, a surface normal vector of an upper surface of the light emitting component 72 can be vertical, and the illumination beam emitted by the light emitting component 72 can be projected an upper portion of the wheel 66. In the embodiment shown in FIG. 25, the surface normal vector of the upper surface of the light emitting component 72 is inclined (such as toward a left side), and therefore the wheel device 10" may be exposed via an inclined opening on a front section of the housing 2; that is to say, the surface normal vector of the upper surface (such as an illuminating surface) of the light emitting component can be perpendicular to the inclined opening of the housing 2, and the illumination beam emitted by the light emitting component 72 can directly pass through the inclined opening of the housing 2 through the wheel 66 or via a side of the wheel 66, so that an area of the mouse 1 where the wheel 66 protrudes from the housing 2 can provide preferred illumination function. An inclined orientation and the inclined angle of the light emitting component 72 are not limited to the embodiment shown in FIG. 25, which depends on the design demand.

The sheltering component 16 can be the independent opaque sheet disposed on the side of the wheel 66, and can be rotated according to rotation of the wheel 66. Generally, the first half roller 62, the second half roller 64 and the wheel 66 do not have the empty space and cannot be used as the optical grating structure. The hollow axle sleeve 86 is used to accommodate the light emitting component 72. In the embodiment, the sheltering component 16 can be directly formed on the rolling surface, the lateral surface and/or the inner portion of the transparent wheel 66, so that the optical signal S emitted by the optical emitter 36 can pass through the transparent wheel 66 with the sheltering component 16, and be received by the optical receiver 38; thus, the wheel module 14" without the empty space can be assembled with the sheltering component 16 to use as the optical grating structure. In addition to the optical grating structure for sheltering the optical signal S, but also the sheltering component 16 can be rotated in accordance with motion of the wheel 66. The illumination beam projected out of the mouse 1 through the wheel 66 can be intermittently sheltered by the light sheltering area 32 formed on the rolling surface, the lateral surface and/or the inner portion of the transparent wheel 66, so that the wheel 66 in the present invention can intermittently illuminate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wheel device applied to a mouse, the wheel device comprising:
   a base comprising a holder;
   a wheel module disposed on the base, the wheel module comprising:
   a roller comprising a rolling surface, an axle, and a plurality of rib structures, the axle being rotatably disposed on the holder in an axle direction, and the plurality of rib structures being disposed inside the rolling surface; and
   a wheel disposed on an outside of the rolling surface;
   a sheltering component comprising an independent opaque sheet detachably disposed on the plurality of rib structures and comprising a plurality of light sheltering areas and a plurality of light penetrating areas on the independent opaque sheet, the plurality of light sheltering areas and the plurality of light penetrating areas being alternately disposed on the roller around the axle direction so that all the plurality of rib structures are blocked by at least a portion of the plurality of light sheltering areas, and each of the light sheltering areas being perpendicular to the axle; and
   an optical detecting module comprising:
   an optical emitter disposed on a first side of the wheel module and adapted to emit an optical signal; and
   an optical receiver disposed on a second side of the wheel module opposite to the first side and adapted to receive the optical signal passing through the wheel module and the plurality of light penetrating areas on the sheltering component.

2. The wheel device of claim 1, wherein the sheltering component is adhered to a side of the roller or the wheel.

3. The wheel device of claim 1, wherein the sheltering component further comprises an outer annular region and an inner annular region, the outer annular region is connected to outer sides of the plurality of light sheltering areas, and the inner annular region is connected to inner sides of the plurality of light sheltering areas.

4. The wheel device of claim 3, wherein at least one of the outer annular region, the inner annular region and the plurality of light sheltering areas of the sheltering component is adhered to lateral edges of the plurality of rib structures or a lateral surface of the wheel.

5. The wheel device of claim 1, wherein a thickness of each rib structure is equal to or smaller than a width of each light sheltering area on the sheltering component.

6. The wheel device of claim 1, wherein a number of the plurality of light sheltering areas is greater than or equal to a number of the plurality of rib structures of the roller.

\* \* \* \* \*